United States Patent Office 3,714,281
Patented Jan. 30, 1973

3,714,281
DEHYDROGENATION WITH A CATALYTIC COMPOSITE CONTAINING PLATINUM RHENIUM, A GROUP VI TRANSITION METAL AND AN ALKALI OR ALKALINE EARTH METAL
John C. Hayes, Palatine, and Ernest L. Pollitzer, Skokie, Ill., assignors to Universal Oil Products Company, Des Plaines, Ill.
No Drawing. Application Jan. 12, 1970, Ser. No. 2,435, which is a continuation-in-part of abandoned application Ser. No. 723,895, Apr. 24, 1968. Divided and this application Dec. 13, 1971, Ser. No. 207,521
Int. Cl. C07c 5/18
U.S. Cl. 260—668 D
18 Claims

ABSTRACT OF THE DISCLOSURE

Dehydrogenatable hydrocarbons are dehydrogenated by contacting them at dehydrogenation conditions with a catalytic composite comprising a combination of catalytically effective amounts of a platinum group component, a rhenium component, a Group VI transition metal component and an alkali or alkaline earth metal component with a porous carrier material. A specific example of the catalytic composite disclosed herein is a combination of platinum, rhenium, tungsten and alkali or alkaline earth metal with a gamma-alumina carrier material in amounts sufficient to result in the composite containing, on an elemental basis, about 0.05 to 1 wt. percent platinum, about 0.05 to 1 wt. percent rhenium, about 0.01 to 1 wt. percent tungsten and about 0.1 to 5 wt. percent of the alkali or alkaline earth metal.

CROSS-REFERENCES TO RELATED APPLICATIONS

This application is a division of our prior, copending application Ser. No. 2,435 filed Jan. 12, 1970, now U.S. Pat. 3,649,566, which in turn is a continuation-in-part of our previous application entitled "Hydrocarbon Conversion Catalyst and Process," filed Apr. 24, 1968, assigned Ser. No. 723,895 and now abandoned.

DISCLOSURE

The subject of the present invention is, broadly, an improved method for dehydrogenating a dehydrogenatable hydrocarbon to produce a product containing the same number of carbon atoms but fewer hydrogen atoms. In another aspect, the present invention relates to a method of dehydrogenating normal paraffin hydrocarbons containing 4 to 30 carbon atoms per molecule to the corresponding normal mono-olefins with minimum production of by-products. Yet another aspect of the present invention involves the use in dehydrogenation of a novel catalytic composite comprising a combination of catalytically effective amount of a platinum group component, a rhenium component, a Group VI transition metal component and an alkali or alkaline earth component with a porous carrier material, which composite has highly preferred characteristics of activity, selectivity, and stability when it is employed in the dehydrogenation of dehydrogenatable hydrocarbons suc has aliphatic hydrocarbons, naphthenic hydrocarbons and alkylaromatic hydrocarbons.

The dehydrogenation of dehydrogenatable hydrocarbons is an important commercial process because of the great and expanding demand for dehydrogenated hydrocarbons for use in the manufacture of various chemical products such as detergents, plastics, synthetic rubbers, pharmaceutical products, lubricants, high octane gasoline, perfumes, drying oils, ion-exchange resins, plasticizers, solvents, and various other products well known to those skilled in art. One example of this demand is in the manufacture of high octane gasoline by using $C_3$ and $C_4$ mono-olefins to alkylate isobutane. Another example of this demand is in the area of dehydrogenation of normal paraffin hydrocarbons to produce normal mono-olefins having 4 to 30 carbon atoms per molecule. These normal mono-olefins can, in turn, be utilized in the synthesis of vast numbers of other chemical products. For example, derivatives of normal mono-olefins have become of substantial importance to the detergent industry where they are utilized to alkylate an alkylatable aromatic such as benzene, with subsequent transformation of the product arylakane into a wide variety of biodegradable detergents such as the alkylaryl sulfonate type of detergent which is most widely used today for household, industrial, and commercial purposes. Still another large class of detergents produced from these normal monoolefins are the condensation products of alkylphenols with ethylene oxide in which the alkylphenol base is prepared by the alkylation of phenol with these normal mono-olefins. Still another type of detergent produced from these normal mono-olefins is a biodegradable alkylsulfate formed by the direct sulfation of the normal mono-olefin. Likewise, the olefin can be subjected to direct sulfonation with sodium bisulfite to make biodegradable alkylsulfonates. As a further example, these mono-olefins can be hydrated to produce alcohols which then, in turn, can be used to produce plasticizers and/or synthetic lube oils.

Regarding the use of products made by the dehydrogenation of alkylaromatic hydrocarbons, these find wide application in industires including the petroleum, petrochemical, pharmaceutical, detergent, plastic and the like. For example, ethylbenzene is dehydrogenated to produce styrene which is utilized in the manufacture of polystyrene plastics, styrene-butadiene rubber, and the like products. Isopropylbenzene is dehydrogenated to form alphamethylstyrene which, in turn, is extensively used in polymer formation and in the manufacture of drying oils, ion-exchange resins, and the like material.

Responsive to this demand for these dehydrogenation products, the art has developed a number of alternative methods to produce them in commercial quantities. One method that is widely utilized involves the selective dehydrogenation of dehydrogenatable hydrocarbons by contacting the hydrocarbons with a suitable catalyst at dehydrogenation conditions. As is the case with most catalytic procedures. The principal measure of effectiveness for this dehydrogenation method involves the ability to perform its intended functions with minimum interference from side reactions for extended periods of time. The analytical terms used in the art to broadly measure how well a particular catalyst performs its intended functions in a particular hydrocarbon conversion reaction are activity, selectivity, and stability, and for purposes of discussion here these terms are generally defined for a given reactants as follows: (1) activity is a measure of the catalyst's ability to convert the hydrocarbon reactant into products at a specified severity level where severity level means the conditions used—that is, the temperature, pressure, contact time, and presence of diluents such as $H_2$; (2) selectivity usually refers to the amount of desired product or products obtained relative to the amount of the reactant charged or converted; (3) stability refers to the rate of change with time of the activity and selectivity parameters—obviously the smaller rate implying the more stable catalyst. More specifically, in a dehydrogenation process, activity commonly refers to the amount of conversion that takes place for a given dehydrogenatable hydrocarbon at a specified severity level and is typically measured on the basis of disappearance of the dehydrogenatable hydrocarbon; selectivity is typically measured by the amount, calculated on a mole percent of converted dehydrogenatable hydrocarbon basis, of the desired dehydrogenated hydrocarbon obtained at the particular severity level; and stability is typically equated to the rate of change with time of activity as measured by disappearance of the dehydrogenatable hydrocarbon and of selectivity as measured by the amount of desired hydrocarbon produced. Accordingly, the major problem facing workers in the hydrocarbon dehydrogenation art is the development of a more active and selective catalytic composite that has good stability characteristics.

We have now found a catalytic composite which possesses improved activity, selectivity, and stability when it is employed in a process for the dehydrogenation of dehydrogenatable hydrocarbons. In particular, we have determined that the use of a catalytic composite, comprising a combination of catalytically effective amounts of a platinum group component, a rhenium component, a Group VI transition metal component and an alkali or alkaline earth component with a porous, refractory carrier material, enables the performance of a dehydrogenation process to be substantially improved. Moreover, particularly good results are obtained when this composite is utilized in the dehydrogenation of long chain normal paraffins to produce the corresponding normal mono-olefins with minimization of side reactions such as skeletal isomerization, aromatization and cracking.

It is, accordingly, one object of the present invention to provide a novel method for dehydrogenation of dehydrogenatable hydrocarbons utilizing a catalytic composite containing a platinum group component, a rhenium component, a Group VI transition metal component and an alkali or alkaline earth component combined with a porous carrier material. A second object is to provide a novel catalytic composite having superior performance characteristics when utilized in a dehydrogenation process. Another object is to provide an improved method for the dehydrogenation of normal paraffin hydrocarbons to produce normal mono-olefins. Yet another object is to improve the performance of a platinum-containing dehydrogenation catalyst by using a combination of a rhenium component and a Group VI transition metal component to beneficially interact with the platinum metal.

In brief summary, one embodiment of the present invention involves a method for dehydrogenating a dehydrogenatable hydrocarbon which comprises contacting the hydrocarbon, at dehydrogenation conditions, with a catalytic composite comprising a combination of a platinum group component, a rhenium component, a Group VI transition metal component and an alkali or alkaline earth component with a porous carrier material. The catalytic composite contains these components in amounts, calculated on an elemental basis, of about 0.05 to about 1 wt. percent of the platinum group metal, about 0.05 to about 1 wt. percent rhenium, about 0.01 to about 1 wt. percent of the Group VI transition metal, and about 0.1 to about 5 wt. percent of the alkali or alkaline earth metal.

A second embodiment relates to the dehydrogenation method described above in the first embodiment wherein the dehydrogenatable hydrocarbon is an aliphatic compound containing 2 to 30 carbon atoms per molecule.

A third embodiment involves the use in a dehydrogenation method of a novel catalytic composite comprising a combination of a platinum group component, a rhenium component, a chromium, molybdenum or tungsten component and an alkali or alkaline earth component with a porous carrier material. These components are present in this composite in amounts sufficient to result in the composite containing, on an elemental basis, about 0.05 to about 1 wt. percent of platinum group metal, 0.05 to about 1 wt. percent rhenium, about 0.01 to about 1 wt. percent chromium, molybdenum or tungsten, and about 0.1 to about 5 wt. percent of the alkali or alkaline earth metal.

Other objects and embodiments of the present invention concern specific details regarding essential and preferred catalytic ingredients, preferred amounts of ingredients, suitable methods of composite preparation, suitable dehydrogentable hydrocarbons, operating conditions for use in the dehydrogenation process, and the like particulars. These are hereinafter given in the following detailed discussion of each of these facets of the present invention.

Regarding the dehydrogenatable hydrocarbon that is subjected to the method of the present invention, it can, in general, be an organic compound having 2 to 30 carbon atoms per molecule and containing at least 1 pair of adjacent carbon atoms having hydrogen attached thereto. That is, it is intended to include within the scope of the present invention the dehydrogenation of any organic compound capable of being dehydrogenated to produce products containing the same number of carbon atoms but fewer hydrogen atoms, and capable of being vaporized at the dehydrogenation temperatures used herein. More particularly, suitable dehydrogenatable hydrocarbons are: aliphatic compounds containing 2 to 30 carbon atoms per molecule, alkylaromatic hydrocarbons where the alkyl group contains 2 to 6 carbon atoms, and naphthenes or alkyl-substituted naphthenes. Specific examples of suitable dehydrogenatable hydrocarbons are: (1) alkanes such as ethane, propane, n-butane, isobutanes, n-pentane, isopentane, neopentane, n-hexane, 2-methylpentane, 2,2-dimethylbutane, n-heptane, 2-methylhexane, 2,2,3-trimethylbutane, and the like compounds; (2) naphthenes such as cyclopentane, methylcyclopentane, ethylcyclopentane, n - propylcyclopentane, cyclohexane, isopropylcyclopentane, 1,3-dimethylcyclohexane, and the like compounds; and (3) alkylaromatics such as ethylbenzene, n-propylbenzene, n-butylbenzene, 1,3,5-triethylbenzene, isopropylbenzene, isobutylbenzene, ethylnaphthalene, and the like compounds.

In a preferred embodiment, the dehydrogenatable hydrocarbon is a normal paraffin hydrocarbon having about 4 to about 30 carbon atoms per molecule. For example, normal paraffin hydrocarbons containing about 10 to 15 carbon atoms per molecule are dehydrogenated by the present method to produce the corresponding normal mono-olefin which can, in turn, be alkylated with benzene and sulfonated to make alkylbenzene sulfonate detergents having superior biodegradability. Likewise, n-alkanes having 12 to 18 carbon atoms per molecule can be dehydrogenated to the corresponding normal mono-olefin which, in turn, can be sulfated or sulfonated to make excellent detergents. Similarly, n-alkanes having 6 to 10 carbon atoms per molecule can be dehydrogenated to form the corresponding mono-olefins which can, in turn, be hydrated to produce valuable alcohols. Preferred feed streams for the manufacture of detergent intermediates contain a mixture of 4 or 5 adjacent normal paraffin homologues such as $C_{10}$ to $C_{13}$, $C_{11}$ to $C_{14}$, $C_{11}$ to $C_{15}$, and the like mixtures.

An essential feature of the present invention involves the use of a catalytic composite comprising a combination of catalytically effective amounts of a platinum group component, a rhenium component, a Group VI transition metal component and an alkali or alkaline earth component with a porous carrier material.

Considering first the porous carrier material utilized in the present invention, it is preferred that the material be a porous, adsorptive, high surface area support having a surface area of about 25 to about 500 m.²/g. The porous carrier material should be relatively refractory to the conditions utilized in the dehydrogenation process, and it is intended to include within the scope of the present invention carrier materials which have traditionally been utilized in hydrocarbon conversion catalyst such as: (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesa, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multivalent cations; and, (6) combinations of one or more elements from these groups. The preferred porous carrier materials for use in the present invention are refractory inorganic oxides, with best results obtained with an alumina carrier material. Suitable alumina materials are the crystalline aluminas known as the gamma-, eta-, and theta-alumina, with gamma-alumina giving best results. In addition, in some embodiments the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 g./cc. and surface area characteristic such that the average pore diameter is about 20 to 3000 angstroms, the pore volume is about 0.1 to about 1 ml./g. and the surface area is about 100 to about 500 m.$^2$/g. In general, best results are typically obtained with a gamma-alumina carrier material which is used in the form of spherical particles having: a relatively small diameter (i.e., typically about 1/16 inch), an apparent bulk density of about 0.5 g./cc., a pore volume of about 0.4 ml./g., and a surface area of about 175 m.$^2$/g.

The preferred alumina carrier material may be prepared in any suitable manner and may be synthetically prepared or naturally occurring. Whatever type of alumina is employed it may be activated prior to use by one or more treatments including drying, calcination, steaming, etc., and it may be in a form known as activated alumina, alumina gel, etc. For example, the alumina carrier may be prepared by adding a suitable alkaline reagent, such as ammonium hydroxide to a salt of alumina such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well-known oil drop method which comprises: forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. It is also a good practice to subject the calcined particles to a high temperature steam treatment in order to remove as much as possible of undesired acidic components. This manufacturing procedure effects conversion of the alumina hydrogel to the corresponding crystalline gamma-alumina. See the teaching of U.S. Pat. No. 2,620,314 for additional details.

One essential ingredient of the instant catalyst is a Group VI transition metal component. Included within the scope of this expression are the metals and compounds of chromium, molybdenum, and tungsten, with tungsten and compounds of tungsten being especially preferred. This component may exist within the final catalytic composite as a compound such as the oxide, sulfide, halide, etc. or as an elemental metal. Regardless of the exact chemical or physical nature of the forces binding this component to the final composite, it is preferred that the final composite contain about 0.01 to about 1 wt. percent of this component, calculated on an elemental basis. A particularly preferred catalyst, for example, would contain, on an elemental basis, about 0.1 to about 0.5 wt. percent tungsten. The function performed by this component is not entirely understood; however, we believe its prime influence is that it acts in conjunction with the rhenium component to promote and stabilize the platinum group component.

This Group VI transition metal component may be incorporated in the final composite in any suitable manner and at any stage in the preparation thereof. One method involves impregnation of the porous carrier material with a suitable solution of the Group VI transition metal at any stage in the preparation of the carrier material—that is, either as a hydrogel or after its calcination. Another method is the ion-exchange method in which a solution of a suitable compound of the Group VI transition metal, wherein the metal is present as an exchangeable ion, is contacted with the carrier material. Still another method involves cogellation or coprecipitation of the Group VI component with the carrier material. The preferred method involves impregnation of the calcined carrier material a suitable solution of the Group VI transition metal at any for example, excellent results are obtained by impregnating with aqueous solution of ammonium tungstate or sodium tungstate, molybdenum, tetrabromide, molybdic acid: chromium dibromide, chromium dichloride, chromium nitrate, sodium chromate, ammonium molybdate, etc., followed by conventional drying and calcination steps.

A second essential ingredient of the catalyst of the present invention is the rhenium component. This component may be present as an elemental metal, as a chemical compound, such as the oxide, sulfide, halide, or in a physical or chemical association with the porous carrier material and/or the other components of the catalyst. Preferably, the rhenium component is utilized in an amount sufficient to result in a final catalytic composite containing about 0.05 to about 1 wt. percent rhenium calculated as an elemental metal. The rhenium component may be incorporated in the catalytic composite in any suitable manner and at any stage in the preparation of the catalyst. As a general rule, it is advisable to introduce the rhenium at a later step of the preparation in order that the expensive metal will not be lost due to subsequent processing involving washing and purification treatments. The preferred procedure for incorporating the rhenium component involves impregnation of the carrier material. The impregnation solution can in some cases be an aqueous solution of a suitable rhenium salt such as ammonium perrhenate, sodium perrhenate, potassium perrhenate and the like salts. In addition, aqueous solution of rhenium halides such as the chloride may be used; however, the preferred impregnation solution is an aqueous solution of perrhenic acid. In general, the rhenium component can be impregnated either prior to, simultaneously with, or after the other components are combined with the carrier material. However, we have found that best results are achieved when the rhenium component is impregnated simultaneously with the other metallic components. In fact, we have determined that a preferred aqueous impregnation solution contains chloroplatinic acid, perrhenic acid, a water-soluble Group VI transition metal compound, and nitric acid.

A third essential constituent for the catalytic composite used in the present invention is a platinum group component. Although the process of the present invention is specifically directed to the use of a catalytic composite containing platinum, it is intended to include other platinum group metals such as palladium, rhodium, ruthenium, osmium, and iridium. The platinum group metallic component such as platinum may exist within the final catalytic composite as a compound such as the oxide, sulfide, halide, etc., or as an elemental metal. Generally, the amount of the platinum group metallic component present in the final catalyst is small compared to the quantities of the other components combined therewith. In fact, the platinum group metallic component generally comprises about 0.05 to about 1% by weight of the final catalytic composite calculated on an elemental basis. Excellent results are obtained when the catalyst contains about 0.3 to about 0.9 wt. percent of the platinum group metal. The preferred platinum group component is platinum or a compound of platinum. Palladium or a compound of palladium can also be used with good results.

The platinum group metallic component may be incorporated in the catalytic composite in any suitable manner such as coprecipitation or cogellation with the carrier material, ion-exchange with carrier material and/or hydrogel, or impregnation either after or before calcination of the carrier material, etc. The preferred method of preparing the present catalyst involves the utilization of a soluble, decomposable compound of the platinum group metal to impregnate the porous carrier material. For example, the platinum group metal may be added to the carrier by commingling the latter with an aqueous solution of chloroplatinic acid. Other water-soluble compounds of the platinum group metals may be employed in impregnation solutions and include ammonium chloroplatinate, bromoplatinic acid, platinum chloride, dinitrodiaminoplatinum, palladium chloride, palladium nitrate, palladium sulfate, diamine palladium hydroxide, tetraminepalladium chloride, etc. The utilization of a platinum chloride compound such as chloroplatinic acid is ordinarily preferred. In addition, it is generally preferred to impregnate the carrier material after it has been calcined in order to minimize the risk of washing away the valuable platinum metal compound; however, in some cases it may be advantageous to impregnate the carrier when it is in a gelled state.

Another essential constituent of the catalyst used in the present invention is the alkali or alkaline earth component. More specifically, this component is selected from the group consisting of the compounds of the alkali metals—cesium, rubidium, potassium, sodium, and lithium—and of the alkaline earth metals—calcium, strontium, barium, and magnesium. This component may exist within the catalytic composite as a relatively stable compound such as the oxide or sulfide, or in combination with one or more of the other components of the composite, or in combination with the carrier material such as, for example, in the form of a metal aluminate. Since, as is explained hereinafter, the composite containing the alkali or alkaline earth is always calcined in an air atmosphere before use in the conversion of hydrocarbons, the most likely state this component exists in during use in dehydrogenation is the metallic oxide. Regardless of what precise form in which it exists in the composite, the amount of this component utilized is preferably selected to provide a composite containing about 0.1 to about 5 wt. percent of the alkali or alkaline earth metal, and, more preferably, about 0.25 to about 3.5 wt. percent. Best results are ordinarily obtained when this component is a compound of lithium or potassium.

This alkali or alkaline earth component may be combined with the porous carrier material in any manner known to those skilled in the art such as by impregnation, coprecipitation, physical mixture, ion-exchange and the like procedures. However, the preferred procedure involves impregnation of the carrier material either before, during or after it is calcined, or before, during or after the platinum group and rhenium components are added to the carrier material. Best results are ordinarily obtained when this component is added to the carrier material after the platinum group, rhenium, and Group VI transition metal components because the alkali metal or alkaline earth metal acts to neutralize some of the acid used in the preferred impregnation procedure for these metallic components. In fact, it is preferred to add the platinum, rhenium and Group VI transition metal components to the carrier material, oxidize the resulting composite at a high temperature (i.e., typically about 800 to 1000° F.), then treat the resulting oxidized composite with a mixture of air and steam in order to remove residual acidity, and thereafter add the alkali metal or alkaline earth component. Typically, the impregnation of the carrier material with this component is performed by contacting the carrier material with a solution of a suitable decomposable compound or salt of the desired alkali or alkaline earth metal. Hence, suitable compounds include the alkali metal or alkaline earth metal halides, sulfates, nitrates, acetates, carbonates, phosphates and the like compounds. For example, excellent results are obtained by impregnating the carrier material after the platinum group, rhenium, and Group VI transition metal components have been combined therewith, with an aqueous solution of lithium nitrate or potassium nitrate.

Regardless of how the components of the catalyst are combined with a porous carrier material, the resulting composite generally will be dried at a temperature of about 200° F. to about 600° F. for a period of from about 2 to 24 hours or more, and finally calcined at a temperature of about 600° F. to about 1100° F. in an air atmosphere for a period of about 0.5 to 10 hours, preferably about 1 to about 5 hours, in order to substantially convert the metallic components to the oxide form. When acidic components are present in any of the reagents used to effect incorporation of any one of the components of the subject composite, it is a good practice to subject the resulting composite to a high temperature treatment with steam or with a mixture of steam and air, either after or before the calcination step described above, in order to remove as much as possible of the undesired acidic component. For example, when the platinum group component is incorporated by impregnating the carrier material with chloroplatinic acid, it is preferred to subject the resulting composite to a high temperature treatment with steam in order to remove as much as possible of the undesired chloride.

It is preferred that the resultant calcined catalytic composite be subjected to a substantially water-free reduction step prior to its use in the dehydrogenation of hydrocarbons. This step is designed to insure a uniform and finely divided dispersion of the metallic components throughout the carrier material. Preferably, substantially pure and dry hydrogen (i.e., less than 20 vol. p.p.m. $H_2O$) is used as the reducing agent in this step. The reducing agent is contacted with the calcined composite at a temperature of about 800° F. to about 1200° F. and for a period of time of about 0.5 to 10 hours or more, effective to substantially reduce at least the platinum group component. This reduction treatment may be performed in situ as part of a start-up sequence if precautions are taken to predry the plant to a substantially water-free state and if substantially water-free hydrogen is used.

Although it is not essential, the resulting reduced catalytic composite may, in some cases, be beneficially subjected to a presulfiding operation designed to incorporate in the catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture containing a mole ratio of $H_2$ to $H_2S$ of about 10:1 at conditions sufficient to effect the desired incorporation of sulfur, generally including a temperature ranging from about 50° F. up to about 1100° F. or more. This presulfiding step can be performed in situ or ex situ.

According to the method of the present invention, the dehydrogenatable hydrocarbon is contacted with a catalytic composite of the type described above in a dehydrogenation zone at dehydrogenation conditions. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, the hydrocarbon feed stream is preheated by any suitable heating means to the desired reaction temperature and then passed into a dehydrogenation zone containing a fixed bed of the catalyst type previously characterized. It is, of course, understood that the dehydrogenation zone may be one or more separate reactors with suitable heating means therebetween to insure that the desired conversion temperature is maintained at the entrance to each reactor. It is also to be noted that the reactants may be contacted with the catalyst bed in either upward, downward, or radial flow fashion, with the latter being preferred. In addition, it is to be noted that the reactants may be in the liquid phase, a mixed liquid-vapor phase, or a vapor phase when they contact the catalyst, with best results obtained in the vapor phase.

Although hydrogen is the preferred diluent for use in the subject dehydrogenation method, in some cases other art-recognized diluents may be advantageously utilized such as steam, methane, carbon dioxide, and the like diluents. Hydrogen is preferred because it serves the dual functions of not only lowering the partial pressure of the dehydrogenatable hydrocarbon, but also of suppressing the formation of hydrogen-deficient, carbonaceous deposits on the catalytic composite. Ordinarily, hydrogen is utilized in amounts sufficient to insure a hydrogen to hydrocarbon mole ratio of about 1:1 to about 20:1, with best results obtained in the range of about 1.5:1 to about 10:1. The hydrogen stream charged to the dehydrogenation zone will typically be recycle hydrogen obtained from the effluent stream from this zone after a suitable separation step.

Regarding the conditions utilized in the method of the present invention, these are generally selected from the conditions well known to those skilled in the art for the particular dehydrogenatable hydrocarbon which is charged thereto. More specifically, suitable conversion temperatures are selected from the range of about 700 to about 1250° F., with a value being selected from the lower portion of this range for the more easily dehydrogenated hydrocarbons such as the long chain normal paraffins and from the high portion of this range for the more difficultly dehydrogenated hydrocarbons such as propane, butane, and the like hydrocarbons. For example, for the dehydrogenation of $C_6$ to $C_{30}$ normal paraffins, best results are ordinarily obtained at a temperature of about 800 to about 950° F. The pressure utilized is ordinarily selected at a value which is as low as possible consistent with the maintenance of catalyst stability, and is usually about 0.1 to about 10 atmospheres, with best results ordinarily obtained in the range of about .5 to about 3 atmospheres. In addition, a liquid hourly space velocity (calculated on the basis of the volume amount, as a liquid, of hydrocarbon charged to the dehydrogenation zone per hour divided by the volume of the catalyst bed utilized) is selected from the range of about 1 to about 40 hr.$^{-1}$, with best results for the dehydrogenation of long chain normal paraffins typically obtained at a relatively high space velocity of about 25 to 35 hr.$^{-1}$.

Regardless of the details concerning the operation of the dehydrogenation step, an effluent stream will be withdrawn therefrom. This effluent will usually contain unconverted dehydrogenatable hydrocarbons, hydrogen, and products of the dehydrogenation reaction. This stream is typically cooled and passed to a separating zone wherein a hydrogen-rich vapor phase is allowed to separate from a hydrocarbon-rich liquid phase. In general, it is usually desired to recover and recycle the unreacted dehydrogenatable hydrocarbon from this hydrocarbon-rich liquid phase in order to make the dehydrogenation process economically attractive. This recovery step can be accomplished in any suitable manner known to the art such as by passing the hydrocarbon-rich liquid phase through a bed of suitable adsorbent material which has the capability to selectively retain the dehydrogenated hydrocarbons contained therein or by contacting same with a solvent having a high selectivity for the dehydrogenated hydrocarbon or by a suitable fractionation scheme where feasible. In the case where the dehydrogenated hydrocarbon is a mono-olefin, suitable adsorbents having this capability are activated silica gel, activated carbon, activated alumina, various types of specially prepared molecular sieves, and the like adsorbents. In another typical case, the dehydrogenated hydrocarbons can be separated from the unconverted dehydrogenatable hydrocarbons by utilizing the inherent capability of the dehydrogenated hydrocarbons to easily enter into several well known chemical reactions such as alkylation, oligomerization, halogenation, sulfonation, hydration, oxidation, and the like reactions. Irrespective of how the dehydrogenated hydrocarbons are separated from the unreacted hydrocarbons, a stream containing the unreacted dehydrogenatable hydrocarbons will typically be recovered from this hydrocarbon separation step and recycled to the dehydrogenation step. Likewise, the hydrogen phase present in the hydrogen separating zone will be withdrawn therefrom, a portion of it vented from the system in order to remove the net hydrogen make, and the remaining portion is typically recycled through suitable compressing means, to the dehydrogenation step in order to provide diluent hydrogen therefor.

In a preferred embodiment of the present invention wherein long chain normal paraffin hydrocarbons are dehydrogenated to the corresponding normal mono-olefins, a preferred mode of operation of this hydrocarbon separation step involves an alkylation reaction. In this mode, the hydrocarbon-rich liquid phase withdrawn from the separating zone is combined with a stream containing an alkylatable aromatic and the resulting mixture passed to an alkylation zone containing a suitable highly acidic catalyst such as an anhydrous solution of hydrogen fluoride. In the alkylation zone the mono-olefins react with the alkylatable aromatic while the unconverted normal paraffins remain substantially unchanged. The effluent stream, for the alkylation zone can then be easily separated, typically by means of a suitable fractionation system, to allow recovery of the unreacted normal paraffins. The resulting stream of unconverted normal paraffins is then usually recycled to the dehydrogenation step of the present invention.

The following working examples are introduced to illustrate further the novelty, mode of operation, utility, and benefits associated with the dehydrogenation method and catalytic composite of the present invention. These examples are intended to be illustrative rather than restrictive.

These examples are all performed in a laboratory scale dehydrogenation plant comprising a reactor, a hydrogen separating zone, a heating means, cooling means, pumping means, compressing means, and the like equipment. In this plant, the feed stream containing the dehydrogenatable hydrocarbon is combined with a hydrogen stream and the resultant mixture heated to the desired conversion temperature, which refers herein to the the temperature maintained at the inlet to the reactor. The heated mixture is then passed into contact with the catalyst which is maintained as a fixed bed of catalyst particles in the reactor. The pressures reported herein are recorded at the outlet from the reactor. An effluent stream is withdrawn from the reactor, cooled, and passed into the separating zone wherein a hydrogen gas phase separates from a hydrocarbon-rich liquid phase containing dehydrogenated hydrocarbons, unconverted dehydrogenatable hydrocarbons and a minor amount of side products of the dehydrogenation reaction. A portion of the hydrogen-rich gas phase is recovered as excess recycle gas with the remaining portion being continuously recycled through suitable compressive means to the heating zone as described above. The hydrocarbon-rich liquid phase from the separating zone is withdrawn therefrom and subjected to analysis to determine conversion and selectivity for the desired dehydrogenated hydrocarbon as will be indicated in the examples. Conversion numbers of the dehydrogenatable hydrocarbon reported herein are all calculated on the basis of disappearance of the dehydrogenatable hydrocarbon and are expressed in mole percent. Similarly, selectivity numbers are reported on the basis of moles of desired hydrocarbon produced per 100 moles of dehydrogenatable hydrocarbon converted.

All of the catalyst utilized in these examples are prepared according to the following general method with suitable modifications in stoichiometry to achieve the compositions reported in each example. First, an alumina carrier material comprising 1/16 inch spheres is prepared by: forming an aluminum hydroxyl chloride sol by dissolving substantially pure aluminum pellets in a hydrochloric acid solution, adding hexamethylenetetramine to the sol, gelling the resulting solution by dropping it into an oil bath to form spherical particles of an alumina hydrogen, aging, and washing the resulting particles with an ammoniacal solution and finally drying, calcining and steaming the aged and washed particles to form spherical particles of gamma-alumina containing substantially less than 0.1 wt. percent combined chloride. Additional details as to this method of preparing this alumina carrier material are given in the teaching of U.S. Pat. No. 2,620,314.

Second, an aqueous solution, containing chloroplatinic acid, perrhenic acid and a water-soluble compound of the particular Group VI transition metal which is to be used, is prepared. The preferred Group VI compounds are: chromium nitrate where chromium is the Group VI component, ammonium tungstate when tungsten is the Group VI component, and ammonium molybdate when molybdenum is the Group VI component. The resulting solution is used to impregnate the gamma-alumina particles. The amounts of the various reagents are carefully selected to yield final catalytic composites containing the required amounts of the metallic components. Nitric acid is also generally added to the impregnation solution in an amount of about 1 to about 10 wt. percent of the alumina particles. In order to insure uniform distribution of metallic components throughout the carrier material, this impregnation step is performed with constant agitation. The impregnation mixture is maintained in contact with the alumina particles for a period of about ½ hour at a temperature of 70° F. thereafter, the temperature of the impregnation mixture is raised to about 225° F. and the excess solution is evaporated in a period of about one hour. The resulting dried particles are then subjected to a calcination treatment in an air atmosphere at a temperature of about 500 to about 1000° F. for about 2 to 10 hours. Thereafter, the resulting calcined particles are treated with an air stream containing from about 10 to about 30% steam at a temperature of about 800 to about 1000° F. for an additional period from about 1 to about 5 hours in order to further reduce the residual combined chloride in the composite.

Finally, the alkali or alkaline earth metal component is added to the resulting calcined particles in a second impregnating step. This second impregnation step involves contacting the calcined particles with an aqueous solution of a suitable decomposable salt of the desired alkali or alkaline earth component. For the composites utilized in the present examples, the salt is either lithium nitrate or potassium nitrate. The amount of this salt is carefully chosen to result in a final composite having the desired composition. The resulting alkali impregnated particles are then dried, calcined and steamed in exactly the same manner as described above following the first impregnation step.

In all the examples the catalyst is reduced during start-up by contacting with hydrogen at an elevated temperature and thereafter sulfided with a mixture of $H_2$ and $H_2S$.

EXAMPLE I

The reactor is loaded with 100 cc. of a catalyst containing, on an elemental basis, 0.375 wt. percent platinum, 0.25 wt. percent rhenium, 0.1 wt. percent tungsten, 0.5 wt. percent lithium, and less than 0.15 wt. percent chloride. The feed stream utilized is commercial grade isobutane containing 99.7 wt. percent isobutane and 0.3 wt. percent normal butane. The feed stream is contacted with the catalyst at a temperature of 1065° F., a pressure of 10 p.s.i.g., a liquid hourly space velocity of 4.0 hr.$^{-1}$ and a hydrogen to hydrocarbon mole ratio of 2:1. The dehydrogenation plant is lined-out at these conditions and a 20 hour test period commenced. The hydrocarbon product stream from the plant is continuously analyzed by GLC (gas-liquid chromatography) and a high conversion of isobutane is observed with the selectivity for isobutylene being relatively high.

EXAMPLE II

The catalyst contains, on an elemental basis, 0.375 wt. percent platinum, 0.25 wt. percent rhenium, 0.25 wt. percent chromium, 0.5 wt. percent lithium, and less than 0.15 wt. percent combined chloride. The feed stream is commercial grade dodecane. The dehydrogenation reactor is operated at a temperature of 870° F., a pressure of 10 p.s.i.g., a liquid hourly space velocity of 32 hr.$^{-1}$ and a hydrogen to hydrocarbon mole ratio of 8:1. After a line-out period, a 20 hour test period is performed during which the average conversion of the normal dodecane is maintained at a high level with a selectivity for normal dodecene of about 90%.

EXAMPLE III

The catalyst is the same as utilized in Example I. The feed stream is normal tetradecane. The conditions utilized are a temperature of 840° F., a pressure of 20 p.s.i.g., a liquid hourly space velocity of 32 hr.$^{-1}$, and a hydrogen to hydrocarbon mole ratio of 8:1. After a line-out period, a 20 hour test shows an average conversion of about 12% and a selectivity for normal tetradecane of about 90%.

EXAMPLE IV

The catalyst contains, on an elemental basis, 0.30 wt. percent platinum, 0.5 wt. percent rhenium, 0.1 wt. percent molybdenum and 0.6 wt. percent lithium, with combined chloride being less than 0.2 wt. percent. The feed stream is substantially pure normal butane. The conditions utilized are a temperature of 950° F., a pressure of 15 p.s.i.g., a liquid hourly space velocity of 4.0 hr.$^{-1}$ and a hydrogen to hydrocarbon mole ratio of 4:1. After a line-out period, a 20 hour test is performed with the average conversion of the normal butane being about 30% and the selectivity for normal butene is about 80%.

EXAMPLE V

The catalyst contains, on an elemental basis, 0.75 wt. percent platinum, 0.25 wt. percent rhenium, 0.2 wt. percent tungsten, 2.8 wt. percent potassium, and less than 0.2 wt. percent combined chloride. The feed stream is commercial grade ethylbenzene. The conditions utilized are a pressure of 15 p.s.i.g., a liquid hourly space velocity of 32 hr.$^{-1}$, a temperature of 1050° F., and a hydrogen to hydrocarbon mole ratio of 8:1. During a 20-hour test period, at least 85% of equilibrium conversion of the ethylbenzene is observed. The selectivity for styrene is about 98%.

It is intended to cover by the following claims all changes and modifications of the above disclosure of the present invention which would be self-evident to a man of ordinary skill in the hydrocarbon conversion art.

We claim as our invention:

1. A method for dehydrogenating a dehydrogenatable hydrocarbon comprising contacting the hydrocarbon, at dehydrogenation conditions, with a catalytic composite comprising a combination of the platinum group component, a rhenium component, a chromium, molybdenum, or tungsten component and an alkali or alkaline earth component with a porous carrier material in a manner such that the components are present in amounts sufficient to result in the composite containing, on an elemental basis, about 0.05 to about 1 wt. percent platinum group metal, about 0.05 to about 1 wt. percent rhenium, about 0.01 to about 1 wt. percent of chromium, molybdenum, or tungsten and about 0.1 to about 5 wt. percent of the alkali metal or alkaline earth metal.

2. A method as defined in claim 1 wherein the platinum component of the composite is platinum or a compound of platinum.

3. A method as defined in claim 1 wherein the porous carrier material is alumina.

4. A method as defined in claim 1 wheren the alkali or alkaline earth component of the composite is a compound of lithium.

5. A method as defined in claim 1 wherein the alkali or alkaline earth component of the composite is a compound of potassium.

6. A method as defined in claim 1 wherein the third-mentioned component of the composite is tungsten or a compound of tungsten.

7. A method as defined in claim 1 wherein the third-mentioned component of the composite is molybdenum or a compound of molybdenum.

8. A method as defined in claim 1 wherein the third-mentioned component of the composite is chromium or a compound of chromium.

9. A method as defined in claim 1 wherein the platinum group component of the composite is palladium or a compound of palladium.

10. A method as defined in claim 1 wherein the alkali or alkaline earth component of the composite is present, on an elemental basis, in an amount of about 0.25 to about 3.5 wt. percent thereof.

11. A method as defined in claim 1 wherein the dehydrogenatable hydrocarbon is admixed with hydrogen when it contacts the catalytic composite.

12. A method as defined in claim 1 wherein the dehydrogenatable hydrocarbon is an aliphatic compound containing 2 to 30 carbon atoms per molecule.

13. A method as defined in claim 1 wherein the dehydrogenatable hydrocarbon is a normal paraffin containing about 4 to 30 carbon atoms per molecule.

14. A method as defined in claim 1 wherein the dehydrogenatable hydrocarbon is a normal paraffin containing about 10 to about 15 carbon atoms per molecule.

15. A method as defined in claim 1 wherein the dehydrogenatable hydrocarbon is an alkylaromatic having an alkyl group containing about 2 to 6 carbon atoms.

16. A method as defined in claim 1 wherein said dehydrogenatable hydrocarbon is a naphthene.

17. A method as defined in claim 11 wherein said dehydrogenation conditions include a temperature of about 700 to about 1200° F., a pressure of about 0.1 to about 10 atmopsheres, an LHSV of about 1 to about 40 hrs.$^{-1}$ and a hydrogen to hydrocarbon mole ratio of about 1:1 to about 20:1.

18. A method as defined in claim 17 wherein the platinum group component of the composite is platinum or a compound of platinum, wherein the alkali or alkaline earth component of the composite is lithium or potassium, and wherein the third-mentioned component of the composite is tungsten or a compound of tungsten.

References Cited

UNITED STATES PATENTS

| | | | |
|---|---|---|---|
| 3,649,564 | 3/1972 | Hayes | 260—669 |
| 3,649,565 | 3/1972 | Wilhelm | 260—669 |
| 3,649,566 | 3/1972 | Hayes et al. | 260—669 |
| 3,647,719 | 3/1972 | Hayes | 260—669 |

CURTIS R. DAVIS, Primary Examiner

U.S. Cl. X.R.

260—669 R, 683.3